Figure 1:
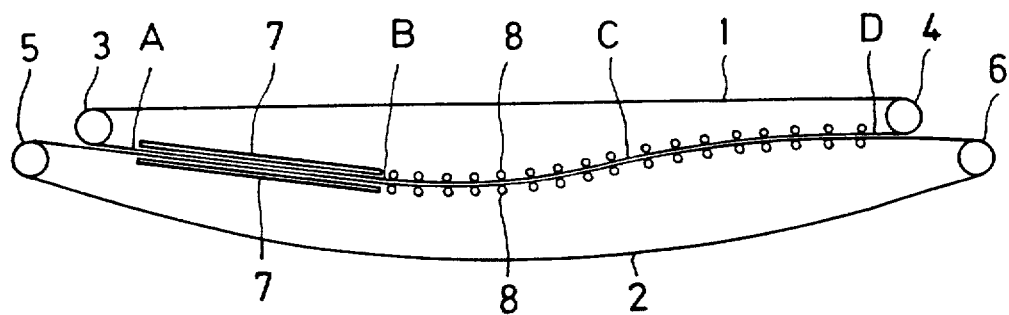

United States Patent [19]

Kato et al.

[11] 4,046,850
[45] Sept. 6, 1977

[54] CONTINUOUS CASTING OF A POLYMERIZABLE COMPOSITION BETWEEN MOVING ENDLESS BELTS

[75] Inventors: Yasuyuki Kato; Masahiko Moritani; Seiichi Suzuki, all of Niihama, Japan

[73] Assignee: Sumitomo Chemical Company, Limited, Osaka, Japan

[21] Appl. No.: 517,617

[22] Filed: Oct. 24, 1974

[30] Foreign Application Priority Data

Oct. 25, 1973 Japan .................... 48-120517

[51] Int. Cl.² .............................................. B29D 7/02
[52] U.S. Cl. .................................. 264/216; 264/213; 264/300; 425/371
[58] Field of Search ............. 264/212, 216, 166, 331, 264/213; 425/371

[56] References Cited

U.S. PATENT DOCUMENTS

| 2,500,728 | 3/1950 | Williams | 264/22 |
|---|---|---|---|
| 3,371,383 | 3/1968 | Hellsund | 425/224 |
| 3,376,371 | 4/1968 | Opel et al. | 264/216 |
| 3,872,197 | 3/1975 | Kato et al. | 264/166 |
| 3,876,485 | 4/1975 | Kinlock et al. | 264/212 |

FOREIGN PATENT DOCUMENTS

895,406  3/1972  Canada

*Primary Examiner*—James B. Lowe
*Attorney, Agent, or Firm*—Birch, Stewart, Kolasch and Birch

[57] ABSTRACT

A continuous casting process and apparatus for a liquid polymerizable composition comprising a pair of endless belts which are arranged such that the lower run of the upper belt is disposed above the upper run of the lower belt and said runs are caused to move in the same direction at substantially the same speed; feeding a liquid polymerizable composition into a space defined between said runs; feeding at least one continuous gasket into said space, together with said composition, in such a manner that said gasket is passed between and in contact with the opposing surfaces of each of the opposite edges of said belts to provide a pair of seals which circumscribe said edges of the moving belts; subjecting said composition to partial polymerization to such an extent that the viscosity of said composition in terms of poise is within the range of 2 to 5 determined by a common logarithm of said viscosity at the temperature of polymerization; leading said partially polymerized composition in a path which is arranged such that said runs are curved at least twice through an inflection point and at the same time brought slightly closer together in response to the volume change of said composition during polymerization without causing the two opposing surfaces of said composition to depart from contact with the associated runs of the belts; and removing the resulting polymerized plate from the discharge end of the belts.

11 Claims, 3 Drawing Figures

CONTINUOUS CASTING OF A POLYMERIZABLE COMPOSITION BETWEEN MOVING ENDLESS BELTS

The present invention relates to a process and apparatus for continuous casting of a liquid polymerizable composition comprising feeding the liquid polymerizable composition into a spacing defined between a pair of moving belts for the continuous polymerization into a plate thereof.

As a process for preparing plates of polymers from polymerizable monomers, cell casting is in general known which comprises casting liquid monomer between a pair of glass sheets by the application of heat or light. For example, the cell casting process has been carried out for the preparation of plates of methacrylic resin from methyl methacrylate, thereby providing the plates thereof with desirable properties including transparency, gloss on the surface and weatherability. The cell casting process involves assembling a cell with a pair of sheets of reinforced glass which are provided with a peripheral gasket, filling the cell with methyl methacrylate monomer or a partially polymerized syrup thereof, immersing the assembly in a hot water bath or hot air oven to thereby polymerize the monomer and stripping the plates of polymeric material from the cell by separating the assembly. The size of the plates which may be produced by this process is restricted by the difficulty in handling large cells made out of sheets of reinforced glass. Furthermore, the manufacturing costs are high as a result of the considerable amount of manual work required during assembly of the cells, filling operations, separation of the cells and subsequent stripping of the plates of polymeric material. Thus, the development of a continuous casting process has been desired for rationalization.

Some continuous casting processes are known, for example, by U.S. Pat. Nos. 2,500,728, 3,371,383 and 3,376,371, Dutch Patent Application No. 6900707 (corresponding to Canadian Pat. No. 895,406) and Japanese Patent Publication No. 41,602/1971 which each disclosed a process for preparing a plate of polymeric material which comprises filling with a polymerizable material a spacing between a pair of endless belts, the first belt being disposed above the second belt, and completing polymerization during the passage thereof through said spacing. These processes, however, cause non-uniformity of the thickness of the resulting plate thereof. Particularly, the difficulties involved in conventional continuous casting are a loss of control over the thickness of the final product in a widthwise direction. For example, Canadian Pat. No. 895,406 discloses that one of the two belts is so curved that the pressure applied by the other belt is made uniform, thus preventing the up-and-down movement of the belts. However, the process disclosed therein is not satisfactory in controlling the preciseness of thickness in the final product.

Accordingly, it is a primary object of the present invention to provide a process for continuous casting of a liquid polymerizable composition. Another object of the present invention is to provide a continuous casting process for preparing a plate of polymeric material comprising filling a spacing between a pair of moving endless belts with a liquid polymerizable composition, the first belt being positioned above the second belt and the belts being arranged such that the lower run of the upper belt and the upper run of the lower belt move in the same direction at substantially the same speed while being curved at least twice and subjecting the composition to polymerization in the course of the passage through the spacing defined between the belts. A further object of the present invention is to provide a continuous casting process comprising feeding a liquid polymerizable composition into a spacing between a pair of endless belts, causing the composition to polymerize partially so as to have a specified viscosity and then bringing the resulting partially polymerized composition to complete polymerization in the course of the passage thereof through the space that is so arranged to be curved at least twice in alternate directions.

Another feature of the present invention is an apparatus for continuous casting of a liquid polymerizable composition. A further object of the present invention is to provide a continuous casting apparatus for preparing a plate of polymeric material which comprises a pair of endless belts which are so arranged and constructed that the lower and upper runs of the respective upper and lower belts move in the same direction at a substantially equal speed while being curved at least twice in alternate directions.

Other objects, features and advantages of the present invention will become apparent in the course of the following detailed description.

The present invention involves a process and apparatus for continuous casting of a liquid polymerizable composition which is subjected to polymerization in the apparatus having a conveyor with endless belts. The composition which is fed into a spacing defined between the belts is polymerized partially so as to have a viscosity in a specified range and then wholly polymerized during the course of its passage through the spacing which is arranged in such a manner that it is curved in opposite directions at least twice. This process by which plates of polymeric material are prepared from a liquid polymerizable composition can easily provide the resulting plates with a uniform thickness and particularly the thickness with uniformity in a widthwise direction.

The continuous casting process of the present invention is carried out by passing a liquid polymerizable composition through a space defined by a pair of moving belts. The belts are disposed in such a manner that the lower run of the first belt is positioned above the upper run of the second belt. The lower and upper runs of the respective upper and lower belts are so arranged as to move in the same direction at substantially the same speed while being curved at least twice in alternate directions. At least one continuous gasket is passed between and in contact with the opposing surfaces of each of the opposite edges of the moving belts, thus providing a pair of seals between said surfaces such that the composition is confined in a space bounded on two opposing sides by said seals. The liquid polymerizable composition is fed continuously into a cavity thus provided and passed through a region in which said composition is caused to polymerize partially to such an extent that a common logarithm of the viscosity of the partially polymerized composition in terms of poise at a temperature at which polymerization takes place is within the range of 2 to 5. This partially polymerized composition is then subjected to complete polymerization by passing it through a region where the lower and upper runs of the respective upper and lower belts are so arranged as to be curved at least twice in alternate directions and further to be brought slightly closer together as said polymerizable composition passes through this region, whereby contact between both said composition and said runs is maintained during polymerization and subsequent volume variation of the polymeric material. The plates of polymeric material are removed from the end portion of the belts opposite to the feed portion.

The continuous casting apparatus of the present invention comprises a pair of moving endless belts which are arranged and disposed such that the lower run of the first belt is positioned above the upper run of the second belt so as to provide a spacing between the two runs. The two belts are constructed such that the lower and upper runs of the respective upper and lower belts are curved at least twice in alternate directions. The opposing edges of the spacing between the belts are circumscribed each with at least one continuous gasket which is so arranged as to move together with the moving belts while being in contact with the moving belts, thus functioning as seals to confine the composition in a cavity defined by the opposing surfaces of the belts and said seals, and the moving belts are provided with a mechanism for adjusting the cavity between said lower and upper runs thereof to a desired thickness of a plate of polymeric material. The lower and upper runs of the respective upper and lower belts are provided with a mechanism for adjusting the cavity in response to variation of the volume of the composition which may take place upon polymerization. The belts are arranged such that the lower and upper runs of the respective upper and lower belts are driven in the same direction at substantially the same speed.

A material for the endless belt to be used for the present invention may be a metal such as steel or stainless steel. A plastic film may be employed together with a metal belt by superimposing the film thereon. In general, the thickness of the metal belt is from about 0.1 to 3 mm. and particularly from 0.5 to 2 mm.

The liquid polymerizable composition of the present invention is composed of one or more unsaturated monomers which are liquid under normal pressure and may be used in such a form that a portion of the unsaturated monomers is partially polymerized to an extent that such a liquid polymerizable composition can be fed between the two moving belts without any undesirable effect. If the composition is used as a syrup where the polymerized monomers are present, it is desirable to use a syrup having a viscosity in a range in which the fluidity thereof is not impaired in feeding it into the moving belts. The viscosity of the syrup may be generally up to about 20 poises.

The unsaturated monomers to be used as the liquid polymerizable composition according to the present invention include, for example, methacrylates, styrene and derivatives thereof having one or more substitutions by a halogen atom and/or an alkyl radical, particularly a lower alkyl having 1 to 6 carbon atoms, vinyl acetate or other monomers containing one or more unsaturations which are different and copolymerizable with said unsaturated monomers, such as acrylates, acrylonitrile and derivatives thereof and a mixture thereof with one or more poly-functionally unsaturated monomers having two or more unsaturations. Said monomers of the type different from and copolymerizable with methacrylates, styrene or derivatives thereof substituted by said substituents may be employed preferably in an amount up to about 20 per cent based upon the total weight of the liquid polymerizable composition. Illustrative examples of the poly-functionally unsaturated monomers are glycol dimethacrylate, diallyl methacrylate, diallyl phthalate, diethylene glycol and bisallyl carbonate. The process of the present invention is particularly suited for the polymerization of methyl methacrylate. The liquid polymerizable composition of the present invention may also be employed with an additive such as a coloring agent, an ultraviolet rays absorbent, a thermal stabilizer, a plasticizer, a stripping agent and a filler.

The polymerization reaction of the present invention may be carried out preferably by means of the radical polymerization reaction known per se to the art. The temperature for the radical polymerization reaction may be preferably from about 50° to 150° C., although it is not limited to said specified range in the present invention. Suitable examples of polymerization initiators capable of forming a radical ion in the above-mentioned temperature range may be an azo compound such as azobisisobutyronitrile, azobisdimethylvaleronitrile, azobiscyclohexanenitrile or the like, and a peroxide such as benzoyl peroxide, lauroyl peroxide, acetyl peroxide, capryl peroxide, 2,4-dichlorobenzoyl peroxide, isopropylperoxydicarbonate, isobutyl peroxide, acetyl cyclohexylsulfonyl peroxide, bis(4-tert.-butylcyclohexyl)-peroxycarbonate or the like. The polymerization initiator may be employed alone or in combination. The amount of the polymerization initiator may be preferably from about 0.005 to 5 percent by weight based on the amount of the liquid polymerizable composition to be used.

The polymerization of the liquid polymerizable composition of the present invention may be effected by passing it between the moving belts through a region where heat is applied to the moving belts. The heating may be accomplished in various ways: spraying hot water on the external surface of the moving belts; passing the moving belts through a hot water bath; steaming the moving belts; and exposing the composition to infrared radiation. The temperature at which the composition is caused to polymerize may be maintained at a constant level throughout the whole region where polymerization takes place, or may be changed continuously or stepwisely. The polymerization temperature may vary depending upon the type and amount of the polymerization initiator, and it is desired to select an appropriate temperature such that a substantial polymerization is complete at the end of the polymerization region. The plate of the polymeric composition may be cooled before or after being removed from the moving belts. The cooling step may be generally accomplished by spraying cold waters or by blowing a cold air against the polymeric plate. Accordingly, it is generally desirable to divide the passage of the moving belts into a region where polymerization is caused to take place by heating and a region where the polymerized product is cooled, while the heating-polymerization region comprises a zone where the unsaturated monomer is caused to polymerize below its boiling point and a zone where the partially polymerized composition is subjected to complete polymerization below the depolymerization temperature of the plates thereof.

The liquid polymerizable composition of the present invention which is fed into a cavity between the belts is first passed through a region where a partial polymerization is caused to take place to such an extent that a common logarithm of the viscosity of the composition in terms of poise at the temperature of polymerization is within the range from 2 to 5 and preferably from 2.7 to 4. This partially polymerized composition having a preferred viscosity is then passed through a region where its path is curved at least twice in opposite directions. If the value of the common logarithm thereof is below the lower limit at a point where the first curve begins to be assumed, the composition tends to leak from the cavity defined between the moving belts, thereby making it difficult to obtain a satisfactory final product or to cause a non-uniform thickness of a plate of polymeric material. The viscosity of the composition above the upper limit expressed in the common logarithm thereof is undesired in obtaining the plate thereof having a uniform thickness because of the non-uniformity in the thickness of the final product thus obtained and, particularly, is lacking in the preciseness of the thickness in a widthwise direction of the plate thereof. Where the liquid polymerizable composition is used having a viscosity expressed in terms of poise and determined by its common logarithm within the preferred range, the plate thereof having a uniform thickness and in particular a thickness with uniformity in a widthwise direction precisely satisfying a desired value is obtained.

A pair of the endless belts to be employed for the present invention are curved at least twice from a point where the belts are initially curved. The point will be referred to as point B hereinafter. The number of the curvatures is not particularly limited, but is preferably from 2 to 4. The adjacent curvatures are connected with each other through an inflection point, that is, a junction of two curvatures (hereinafter referred to in general as point C). Thus the belts having from two to four curves possess from one to three inflection points, respectively. A substantially straight portion may be positioned between the adjacent curvatures, but it should be arranged such that a straight portion between the adjoining curvatures shares a common tangent to the two curvatures at a common inflection point. However, such a straight portion should not be too long because it may impair the effect to be expected by providing the belts with said curvatures. A point where a series of curvatures end (hereinafter referred to as point D) is also the point of the end portion of a mechanism for adjusting the space between the belts in response to the volume change of the composition and the plate thereof.

The lower and upper runs of the respective upper and lower belts according to the present invention may be arranged such that said runs follow an undulated curvature in the form of a flattened sine curve, i.e., said runs being curved in opposite directions at least twice through a common inflection point. Where the moving belt made of a metal, for example stainless steel, is employed, the radius of said curvatures which are assumed at least twice from point B may be represented by the following equation:

$$R = K \times L$$

where R is the radius of curvature (in meters); $L$ is the horizontal distance between points $B$ and $D$ (in meters); and K is a constant. The value for constant K varies depending upon the horizontal distance L and the number of the curvatures and may vary from 0.5 to 5, and preferably from 1 to 4. Where the number of the curvatures ranges, for example, from 2 to 4, the value for the constant K may be within said range and the radius of curvature of the curved portions on the belts may be each the same or different. Where the horizontal distance L becomes longer, it is desired, to increase the number of the curved portions, for example, from three or four. However, their radii of curvatures may be the same or different and the value for the constant K may be within said range. When the value for K is smaller than the lower limit, the lower and upper runs of the respective upper and lower belts which are so arranged as to move in the same direction at substantially the same speed tend to slide slightly out of position, thus causing a relative movement between said runs so that the surfaces of plates of polymeric material are impaired. In this case, it is also disadvantageous with respect to the strength of the moving belts. On the other hand, when the constant K is larger than the upper limit, a plate of polymeric material is not provided with a uniform thickness because of the large radius of curvature which may reduce the effect that is expected to result from curving the belts in a specified manner. In this case, the preciseness of thickness of the plate thereof is lacking in a widthwise direction. Thus the plate thereof having a uniform thickness, particularly in a widthwise direction precisely satisfying a desired value, can be obtained where the belts are to be curved at least twice from point B and the constant K is within said range.

A feed point where the liquid polymerizable composition is fed may be provided with a device for holding a predetermined amount of said composition to feed it into a cavity defined by the moving belts or a device for preventing the upper moving belt from loosening or slackening toward the lower moving belt by means of liquid pressure. The feed of said composition may be transferred up to point B in various manners: by driving the belts in a horizontal manner or in a straight manner inclined at an apopropriate angle to the horizontal or in a manner following an inclined path defined by their natural curvature.

In order to obtain a plate of polymeric material having a desired thickness, the heating-polymerization region up to point B may be provided with a mechanism for adjusting and maintaining a space between the belts at a desired predetermined distance while bringing the surfaces of the belts in contact with the gaskets, thereby preventing leakage of the feed composition. This mechanism may also be so arranged and constructed as to bring the surfaces of the belts closer together to an extent sufficient to compensate for any shrinkage of the composition during polymerization. That mechanism may also be employed in combination with a mechanism for bringing the surfaces of the belts closer together to an extent sufficient to compensate for any shrinkage of the composition during polymerization such that said surfaces are maintained in contact with said composition during polymerization. For these purposes, a rotating member such as rollers or a non-rotating member having a smooth surface may be provided.

The path along which the composition is passed is caused to be curved from point B and, at the same time, the viscosity of the composition becomes higher. In the polymerization region from point B, it is preferred to provide a rotating support such as rollers for supporting the moving belts, whereby the belts are to be brought closer together to compensate for the change of volume of the composition during polymerization.

The rotating support such as rollers may also be arranged such that, where a portion of the path has an upward curvature, a set of rollers are positioned only on one side of the lower run of the upper belt to thereby cause a corresponding portion of said lower run to extend in an upwardly curved manner, while a corresponding portion of the upper run of the lower belt is adapted to follow the curve of that portion of said lower defined by said set of the rollers, by the effect of tension imparted to the lower belt. In the polymerization region commencing from point B, it is also desired to provide a mechanism for adjusting and maintaining the space between the belts at a desired predetermined distance.

Figure 2:
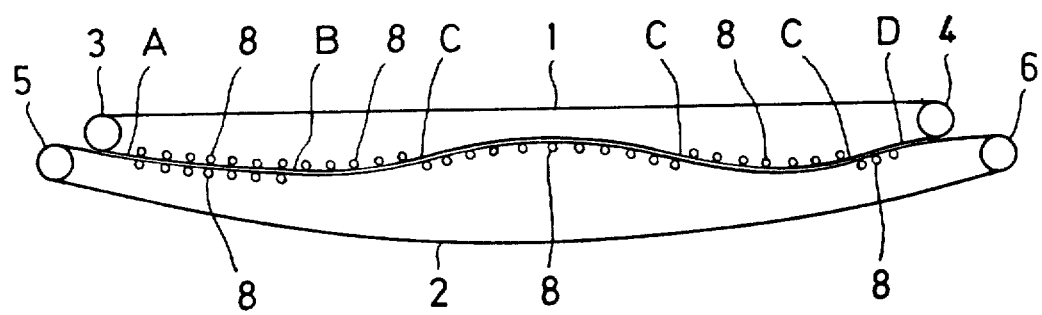
Figure 3:
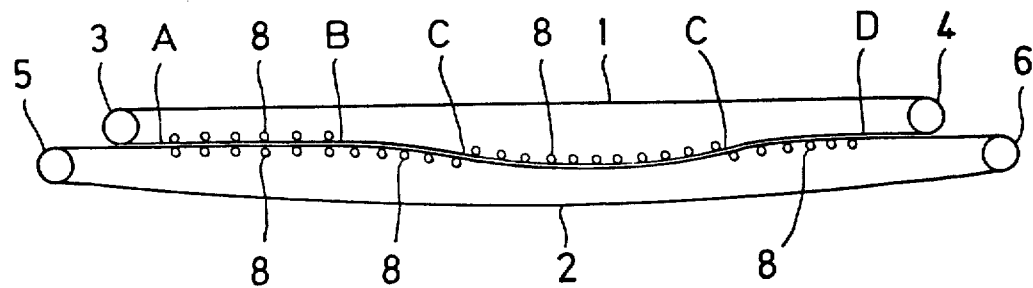

Referring now to the drawings,

FIG. 1 illustrates a side view of the continuous casting apparatus of the present invention wherein the path defined by the moving belts is curved twice; and FIGS. 2 and 3 illustrate each a side view of the continuous casting apparatus of the present invention wherein the belts are curved four times and three times, respectively.

As shown in FIGS. 1, 2, and 3, these are examples of the continuous casting apparatus of the present invention wherein the lower belt is longer than the upper belt. These figures each indicate a relative location of point B at which the initial curvature starts and point C or an inflection point at which the adjacent curvatures change from one direction to the other alternate direction in the region beteen point A where the heating polymerization is caused to be carried out and point D where a mechanism capable of following the variation of volume of the polymerized composition ends. FIG. 1 illustrates the moving belts from point B to point C with one inflection point joining two curvatures; FIG. 2 shows the belts with three inflection points connecting four curvatures; and FIG. 3 illustrates the belts with two inflection points which are linked with three curvatures. FIG. 1 further illustrates the heating-polymerization region which is arranged in such a manner that the belts between point A and B are straightly disposed and inclined at an appropriate angle to the horizontal. In FIG. 2, there is illustrated the region defined between point points A and B which is arranged such that the path is inclined at an appropriate angle to the horizontal, as shown in FIG. 1, but it is defined by their natural curvatures. FIG. 3 illustrates a horizontal and straight region between points A and B.

As further shown in FIGS. 1, 2, and 3, endless belts 1 and 2 are driven by pulleys 3, 4, 5 and 6 which provide the belts with tension. A pair of the pulleys 4 and 6 may be constructed such that they are driven at the same peripheral speed or such that either of them alone is driven, while the other is caused to move by the action exerted by the feed composition and the plate thereof and/or gaskets, thus permitting the belts 1 and 2 to move concurrently at substantially the same speed. The composition and the gaskets are fed continuously into the feed inlet between a pair of the pulleys 3 and 5 and the resulting plate is removed from the other end portion or the outlet between a pair of the pulleys 4 and 6.

Referring to FIG. 1, the lower and upper runs of the respective upper and lower belts in the path between points A and B are held and maintained at a desired predetermined distance by a non-rotating support 7 having a frame structure. The lower and upper runs of the respective upper and lower belts are caused to follow a predetermined path having one inflection point, as at point C, of the curvatures between the points B and D in such a manner that the rollers of each pair as indicated generally by numeral 8 are positioned with the lower and upper runs of the individual belts 1 and 2 throughout the entire path between the points B and D. Thus, said runs are so arranged as to follow in response to variation of the volume of said composition during polymerization.

As shown in FIGS. 2 and 3, the lower and upper runs of the respective upper and lower belts between points A and B are held and maintained by a pair of the rollers indicated generally by numeral 8 to provide a spacing at a desired predetermined distance. The rollers are arranged in such a maner that, where a portion of the path is upwardly curved, a set of rollers are positioned only one side of the lower run of the upper belt 1 to thereby forcibly guide a corresponding portion of the lower run thereof to extend in an upwardly curved manner, while a corresponding portion of the upper run of the lower belt 2 is adapted to follow the curve of that portion of the lower run of the upper belt 1, defined by said set of the rollers 8, by the effect of tension imparted to the lower belt 2. Similarly, where a portion of the path is downwardly curved, a set of rollers are positioned only on one side of the upper run of the lower belt 2 to thereby forcibly guide a corresponding portion of the upper run thereof to extend in a downwardly curve manner, while a corresponding portion of the lower run of the upper belt 1 is adapted to follow the curve of that portion of the upper run of the lower belt 2 defined by said set of the rollers 8, by the effect of tension exerted to the upper belt 1.

FIGS. 1, 2, and 3 illustrate further examples of the embodiments of the apparatus of the prevent invention where the pulleys 3 and 4 are positioned on the same height. In driving the belts of the present invention, however, either of the pulleys may also be disposed in a position higher or lower than the other pulley. It is nevertheless preferred to arrange the height of the two pulleys at the same height in order to lower the height of a housing of the apparatus. As set forth hereinabove, the figures show the endless belts in which the upper belt is shorter than the lower belt, but the length of the upper belt may also be the same as that of the lower belt.

It is desired to make as short as possible the distance between point A and the pulley on the feeding side of the belts as well as the distance between point D and the pulley on the other side thereof. The point D may be positioned at the point on the belts just below the corner of the pulley for driving the upper belt. The distance between point D and the pulley on the discharge side of the belt may be horizontally or straightly positioned and inclined at an angle to the horizontal. The spacing in this distance may be wider than the thickness of the plate of polymeric material produced. The shortening of the distances between the feed point and point A and/or between point D and the discharge point can make the effective heating-polymerization region longer. As described hereinabove, an area between points A and D is generally provided with a zone where the composition is polymerized and a zone where the plates of polymeric material are cooled; it is desired to provide the cooling zone from the standpoint of the ease of the removal of the plate thereof from the moving belts.

The gasket to be used for the present invention is generally of filamentous plastic. Examples of its materials are soft polyvinyl chloride, polyethylene, polypropylene, ethylene-vinyl acetate copolymer, natural rubber, rubbers of different type and other flexible plastic materials, soft polyvinyl chloride being generally preferred. The preferred soft polyvinyl chloride may be one containing from 80 to 170 parts by weight of a plasticizer such as dioctyl phthalate per 100 parts by weight of polyvinyl chloride. The cross section of the gasket may be in the form of a square, rectangle or circle, and the gasket in the form of a hollow pipe is generally preferred.

The following examples illustrate the present invention without, however, limiting the same thereto. In the following examples, percent is by weight.

EXAMPLE 1

An apparatus comprises a pair of stainless steel belts having a flat highly polished surface, a width of 500 mm. and a thickness of 0.6 mm. which are arranged and constructed such that the lower and upper runs of the respective upper and lower belts are curved twice from point B as shown in FIG. 1 and which are provided with a mechanism for adjusting a spacing defined between said belts in a distance of a heating-polymerization zone and a cooling zone such that said runs follow in response to variation of the volume of a liquid polymerizable composition during polymerization. The horizontal distance between points A and B is 3,500 mm. and the runs in the distance are arranged in a straight manner with a nonrotating support having a frame structure and inclined at an angle of 6° 31' to the horizontal. The horizontal distance B – C is 3,270 mm. and the belts are curved at a radius of curvature of 10,000 mm. with only the lower run of the upper belt held by rollers. The horizontal distance C – D is 3,230 mm. with the belts curved at a radius of curvature of 15,142 mm. and only the upper run of the lower belt held by rollers. Of the horizontal distance A – D of 10,000 mm., the first 8,910 mm. distance is the heating-polymerization zone which is provided with a zone of the first 6,740 mm. where hot water having a temperature of 85° C. is applied and zone of the remaining 2,170 mm. where a hot air of 120° C. is blown and the rest of the distance is provided with a zone where the cooling is effected by the application of cool air.

A syrup having a viscosity of 4 poises at 25° C. and containing a solution of 14 percent of polymethyl methacrylate and 0.08 percent of azobisisobutyronitrile in methyl methacrylate was fed together with a soft polyvinyl chloride gasket into a spacing defined between the belts which were held under an initial tension of 6 kg. per sq. mm. and driven at a belt speed of 217 mm. per minute. The runs were arranged such that plates of polymeric material having a thickness of 3 mm. were obtained. The syrup fed was caused to polymerize in the heating-polymerization zone and to cool in the cooling zone, thereby resulting in the plate of polymethyl methacrylate. The viscosity of the composition at point B was found to be 1,250 poises.

This plate was found to have a reduced viscosity of 3.4 dl. per gram in a 0.1 percent chloroform solution at 25° C. and 0.8 percent of the remaining methyl methacrylate. The thickness of the plate in a widthwise direction varied from 2.93 mm. as the minimum to 3.06 mm. as the maximum thickness and it was found that the preciseness of the plate thickness was very favorable.

COMPARATIVE EXAMPLE 1

The procedure of Example 10 was repeated using the same apparatus except for a syrup having a viscosity of 4 poises at 25° C. and containing a solution of 14 percent of polymethyl methacrylate and 0.22 percent of azobisisobutyronitrile in methyl methacrylate, thus resulting in a plate of polymethyl methacrylate. The viscosity of the syrup at point B was found to be 400,000 poises.

This plate showed a reduced viscosity of 2.0 dl. per gram at 25° C. in a 0.1 percent chloroform solution and contained 0.7 percent of the remaining methyl methacrylate. The thickness thereof in a widthwise direction varied from 2.51 mm. to 3.47 mm. The reason for the nonuniformity of the thickness in a widthwise direction was assumed to result from the high viscosity at point B, thus providing no effect from the curved belts.

COMPARATIVE EXAMPLE 2

An apparatus was used where a pair of the stainless steel belts of Example 1 were arranged as in Example 1 such that the belts between points A and B having a horizontal distance of 1,700 mm. were straightly disposed with the both runs thereof held by a non-rotating support having a frame structure and inclined at an angle of 13° 14' to the horizontal; said runs between points B and C having a horizontal distance of 5,220 mm. were curved at a radius of curvature of 10,000 mm. with only the lower run of the upper belt held by rollers; said runs between points C and D having a horizontal distance of 3,080 mm. were curved at a radius of curvature of 10,489 mm. with the upper run of the lower belt alone held by rollers; and the distance between points A and D totaling 10,000 mm. was arranged in the same manner as in Example 1.

The same syrup and gasket were fed continuously into the apparatus and subjected to polymerization, as in Example 1. However, leakage of the syrup was caused after point B, thus resulting in the production of an unsatisfactory plate thereof. This was assumed to result from the low viscosity of the syrup at point B where, in this case, its viscosity was found to be 35 poises.

COMPARATIVE EXAMPLE 3

The apparatus of Example 1 was used but the belts were arranged such that the lower and upper runs of the respective upper and lower belts points A and D having a horizontal distance of 10,000 mm. were disposed in a straight manner and inclined at an angle of 6° 31' to the horizontal and said runs were held by rollers.

The same syrup and gasket were fed into the said apparatus and subjects to polymerization under the same conditions, as in Example 1.

The plate of polymeric material thus obtained was found to have a reduced viscosity of 3.2 dl. per gram at 25° C. in a 0.1 percent chloroform solution and to contain 0.9 percent of the remaining methyl methacrylate. The thickness of this plate ranged from 2.50 mm. to 3.54 mm. This low preciseness of the plate thickness was assumed to result from the use of the belts which were not curved during the course of polymerization.

EXAMPLE 2

A syrup having a viscosity of 2 poises at 25° C. and containing a solution of 0.08 percent of azobisisobutyronitrile in a syrup obtained by adding 0.001 percent of azobisisobutyronitrile in methyl methacrylate and polymerizing them at 80° C. and the gasket of Example 1 were fed continuously into the apparatus of Example 1. The polymerization of the syrup was effected in the region which was arranged in the same manner as in Example 1 except that hot water of 90° C was employed in place of the hot water of 85° C. The viscosity of the syrup at point B was 400 poises.

The plate of polymethyl methacrylate thus obtained was found to show a reduced viscosity of 3.1 dl. per gram at 25° C. in a 0.1 percent chloroform solution and 0.9 percent of the remaining methyl methacrylate. The thickness in a widthwise direction of its plate was found to range from 2.89 mm. to 3.12 mm. This shows a good preciseness in the thickness of the plate of polymeric material.

EXAMPLE 3

An apparatus having substantially the same structure as shown in FIG. 3 was employed in which a pair of the stainless steel belts of Example 1 were arranged such that their runs between points A and B having a horizontal distance of 2,900 mm. were straightly and horizontally disposed with both the lower run of the upper belt and the upper run of the lower belt held by rollers; said runs between points B and C having a horizontal distance of 1,775 mm. were curved at a radius of curvature of 10,000 mm. with the upper run of the lower belt alone held by rollers; said runs between points C and C having a horizontal distance of 3,550 mm. were curved at a radius of curvature of 10,000 mm. with only the lower run of the upper belt held by rollers; said runs between points C and D having a horizontal distance of 1,775 mm. were curved at a radius of curvature of 10,000 mm. with the upper run of the lower belt alone held by rollers; and the distance between points A and D was divided into the heating-polymerization and cooling zones in which the polymerization zone was provided with a device for polymerizing the composition of the present invention by the applications of hot water of 90° C. and hot air of 120° C., as described in Example 1.

A syrup having a viscosity of 4 poises at 25° C. and containing a solution of 25 percent of polymethyl methacrylate and 0.02 percent of azobisdimethylvaleronitrile in methyl methacrylate was fed, while being pressurized so as to prevent drops of the upper belt, together with the gasket of Example 1 into a cavity defined between the moving belts which were held under an initial tension of 6 kg. per sq. mm. and driven at a belt speed of 270 mm. per minute, thus resulting in the polymerization of the composition to give a plate of polymethyl methacrylate. The viscosity of the syrup at point B was 7,900 poises.

The plate of polymethyl methacrylate was found to show a reduced viscosity of 3.6 dl. per gram at 25° C. in a 0.1 percent chloroform solution and to contain 1.1 percent of the remaining methyl methacrylate. The thickness of its plate in a widthwise direction was found to vary from 2.96 mm. to 3.06 mm. This shows that the plate thereof thus obtained had a very uniform thickness with preciseness in a widthwise direction.

EXAMPLE 4

An apparatus having substantially the same structure as shown in FIG. 1 was employed which comprised a pair of stainless steel belts having a flat highly polished surface, a width of 1,500 mm. and a thickness of 1.6 mm. The belts were arranged and constructed such that the lower and upper runs of the respective upper and lower belts between points A and B having a horizontal distance of 8,500 mm. were straightly disposed with the two runs held with rollers and inclined at an angle of 7° 22' to the horizontal; their runs between points B and C having a horizontal distance of 10,680 mm. were curved at a radius of curvature of 35,000 mm. with the lower run of the upper belt alone held by rollers; said runs between points C and D having a horizontal distance of 9,520 mm. were curved at a radius of curvature of 67,970 mm. with the upper run of the lower belt alone held by rollers; and the distance between points A and D totaling 28,700 mm. was divided into the heating-polymerization zone (25,580 mm.) and the cooling one (3,120 mm.), the polymerization zone being provided with a device for polymerizing a composition of the present invention by applying hot water of 80° C. in the preceding region (19,340 mm.) and a device for the same purpose as above by the application of hot air of 120° C. in the following region (6,240 mm.).

A syrup having a viscosity of 4 poises at 25° C. and containing a solution of 14 percent of polymethyl methacrylate and 0.5 percent of lauroyl peroxide in methyl methacrylate was fed together with the gasket of Example 1 into a cavity defined between the moving belts on the one end of the apparatus which were held under an initial tension of 6 kg. per sq. mm. and driven at a belt speed of 624 mm. per minute, thereby resulting in the polymerization of the syrup fed into a plate of polymethyl methacrylate. The viscosity of the syrup at point B was 352 poises.

This plate was found to show a reduced viscosity of 2.8 dl. per gram at 25° C. in a 0.1 percent chloroform solution and to contain 0.6 percent of the remaining methyl methacrylate. The thickness of this plate in a widthwise direction ranged from 2.90 mm. to 3.08 mm. This shows a very good preciseness in the thickness of the plate of the polymeric material.

What is claimed is:

1. A process for continuously casting a liquid polymerizable composition which comprises:
    1. feeding the liquid polymerizable composition into a spacing defined between a pair of moving metal endless belts having thicknesses in the range of from 0.1 to 3 mm. which are arranged such that the lower run of the upper belt is disposed above the upper run of the lower belt and the runs are caused to move concurrently with each other in the same direction at substantially the same speed;
    2. feeding a pair of continuous gaskets into the spacing together with the liquid polymerizable composition, in such a manner that the gaskets travel between and in contact with the opposing surfaces at the opposite edges of the belts to form a pair of seals and define a cavity between the surfaces and the seals, and wherein the belts are provided with a mechanism for adjusting the cavity in response to variation in volume of the composition which may take place during polymerization;
    3. passing the liquid polymerizable composition through a region of the path defined by the belts where said composition is partially polymerized at a temperature of from 50° to 150° C. to such an extent that the common logarithm of the viscosity of the composition in terms of poise at the temperature of polymerization is within the range of from 2 to 5;
    4. passing the partially polymerized composition through a region in which the lower and upper runs of the respective upper and lower belts are curved in opposite directions at least twice downwardly and then upwardly or vice versa through a common inflection point at the radius of the curves represented by the following equation:

$$R = K \times L$$

where $R$ is the radius of curvature in meters; $L$ is the horizontal distance between the point at which the initial curvature starts and the point where a mechanism capable of following the variation of volume of the polymerized composition ends; and K is a constant; the value of the constant K varying depending upon the horizontal distance L and the number of curves and being within a range of from 0.5 to 5, and the runs are brought closer together as the composition passes through the spacing between the belts, whereby contact of the composition with the respective lower and upper runs of the upper and lower belts is maintained during the polymerization and subsequent volume variation of said composition and while the polymerization is completed; and 5. removing the resulting rigid plate of the polymerized composition from the belts at the side opposite to the feed side of the moving belts.

2. The process according to claim 1, wherein the common logarithm of the viscosity of the composition in terms of poise at the temperature at which polymerization takes place is within the range of about 2.7 to 4.

3. The process according to claim 1, wherein the liquid polymerizable composition is one or more polymerizable, unsaturated monomers selected from the group consisting of methacrylates, styrene and derivatives thereof having one or more substituents of a halogen atom and/or an alkyl radical, vinyl acetate and other polymerizable monomers containing one or more unsaturations which are different and copolymerizable with said monomers, selected from the group consisting of acrylates, acrylonitrile and derivatives thereof, and a mixture thereof with one or more poly-functionally unsaturated monomers having two or more unsaturations, selected from the group consisting of glycol dimethacrylate, diallyl methacrylate, diallyl phthalate, diethylene glycol and bisallyl carbonate.

4. The process according to claim 3, wherein the liquid polymerizable composition comprises methyl methacrylate.

5. The process according to claim 1, wherein a polymerization initiator is added in the amount of about 0.005 to 5 percent by weight based upon the amount of the liquid polymerizable composition.

6. The process according to claim 5, wherein the polymerization initiator is one or more azo compounds selected from the group consisting of azobisisobutyronitrile, azobismethylvaleronitrile and azobiscyclohexanenitrile or one or more peroxides selected from the group consisting of benzoyl peroxide, lauroyl peroxide, acetyl peroxide, caproyl peroxide, 2,4-dichlorobenzoyl peroxide, isopropyl peroxy dicarbonate, isobutyl peroxide, acetyl cyclohexylsulfonyl peroxide and bis(4-tert.-butylcyclohexyl)peroxycarbonate or a mixture of said azo initiator with said peroxide initiator.

7. The process according to claim 1, wherein the gaskets are made of a flexible plastic material selected from the group consisting of soft polyvinyl chloride, polyethylene, polypropylene and ethylene-vinyl acetate copolymer or a natural or synthetic rubber.

8. The process according to claim 7, wherein the gaskets are made of soft polyvinyl chloride containing about 80 to 170 parts by weight of a plasticizer based upon 100 parts by weight of the polyvinyl chloride.

9. The process according to claim 7, wherein the gaskets are in the form of a square, a rectangle or a circle.

10. The process according to claim 9, wherein the gaskets are in the form of a hollow pipe.

11. The process according to claim 8, wherein the plasticizer is dioctyl phthalate.

* * * * *